(12) United States Patent
Zangooie et al.

(10) Patent No.: US 7,646,491 B2
(45) Date of Patent: Jan. 12, 2010

(54) DETERMINING AZIMUTH ANGLE OF INCIDENT BEAM TO WAFER

(75) Inventors: Shahin Zangooie, Hopewell Junction, NY (US); Roger M. Young, Warwick, NY (US); Lin Zhou, LaGrangeville, NY (US); Clemente Bottini, Marlboro, NY (US); Ronald D. Fiege, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 11/766,820

(22) Filed: Jun. 22, 2007

(65) Prior Publication Data

US 2008/0316471 A1     Dec. 25, 2008

(51) Int. Cl.
G01B 11/24     (2006.01)
(52) U.S. Cl. ..................................................... 356/601
(58) Field of Classification Search ......... 356/601–611, 356/138–142
See application file for complete search history.

(56) References Cited

U.S. PATENT DOCUMENTS 7,224,471 B2 *  5/2007  Bischoff et al. ............. 356/601
7,414,733 B2 *  8/2008  Bischoff et al. ............. 356/601

* cited by examiner

*Primary Examiner*—Michael P Stafira
(74) *Attorney, Agent, or Firm*—Ian D. MacKinnon; Hoffman Warnick LLC

(57) ABSTRACT

A method, system and computer program product for determining an Azimuth angle of an incident beam to a wafer are disclosed. A method comprises: using the incident beam to make a first set of measurements of calibration targets of a first set of grating angles that are different than one another; analyzing the first set of measurements to determine an reference grating angle which corresponds to a grating line to which the incident beam has a practically zero Azimuth angle; and determining the Azimuth angle of the incident beam to the wafer using the determined reference grating angle.

12 Claims, 7 Drawing Sheets

DETERMINING AZIMUTH ANGLE OF INCIDENT BEAM TO WAFER

BACKGROUND OF THE DISCLOSURE

1. Technical Field

The present disclosure relates in general to a processing system, and more particularly to determining an Azimuth angle of an incident beam of a Scatterometry tool to a wafer.

2. Background Art

The use of Scatterometry in semiconductor manufacturing has grown significantly over the past several years. This technology provides the capability to conduct measurements of a wide variety of critical wafer parameters, including, e.g., critical dimensions, depths and sidewall angles.

Figure 1:
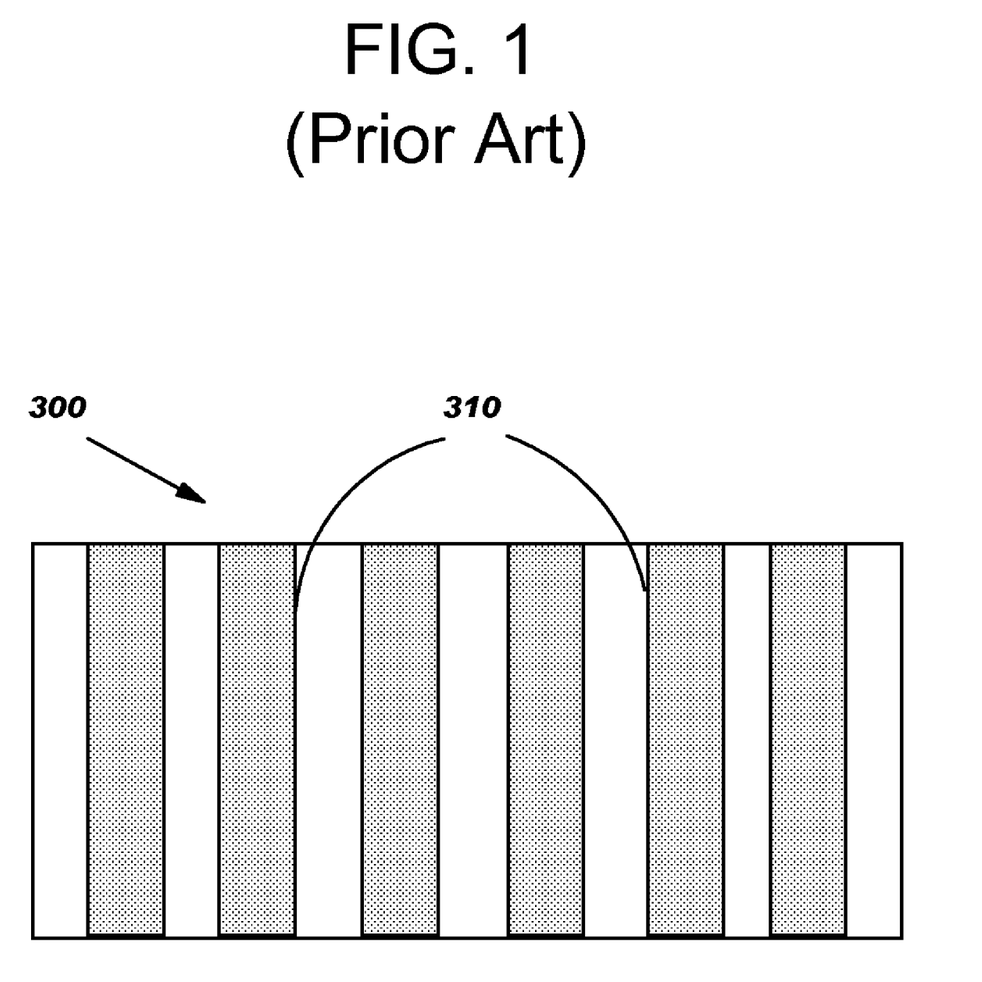
FIG. 1 shows an illustrative example of a wafer with grating lines according to prior art.
Figure 2:
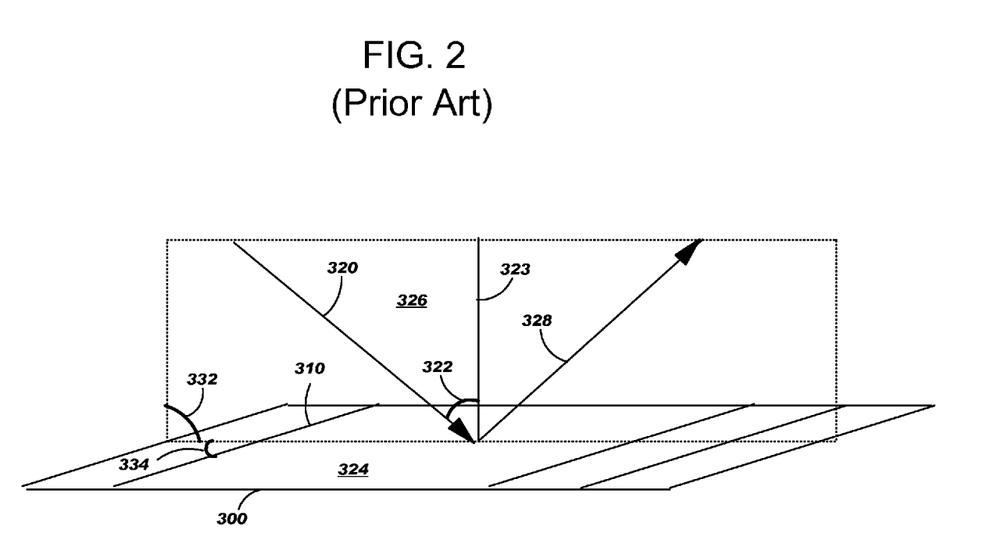
FIG. 2 shows an illustrative incident light beam and a plane of incidence according to prior art.

Scatterometry is generally used for the characterization of a target with a series of periodic lines and spaces, commonly referred to as grating lines. FIG. 1 shows an illustrative example of a measurement target 300 with grating lines 310. FIG. 2 shows an incident light beam 320 (incident beam) that strikes target 300 at an angle 322 to a surface normal 323 of a target surface 324. A plane 326 containing incident beam 320 and a reflected beam 328 is usually referred to as a plane of incidence. An ideal plane of incidence 326 is normal to both target 300 surface 324 and to grating lines 310, i.e., both angles 332 and 334 are 90 degrees.

Figure 3:
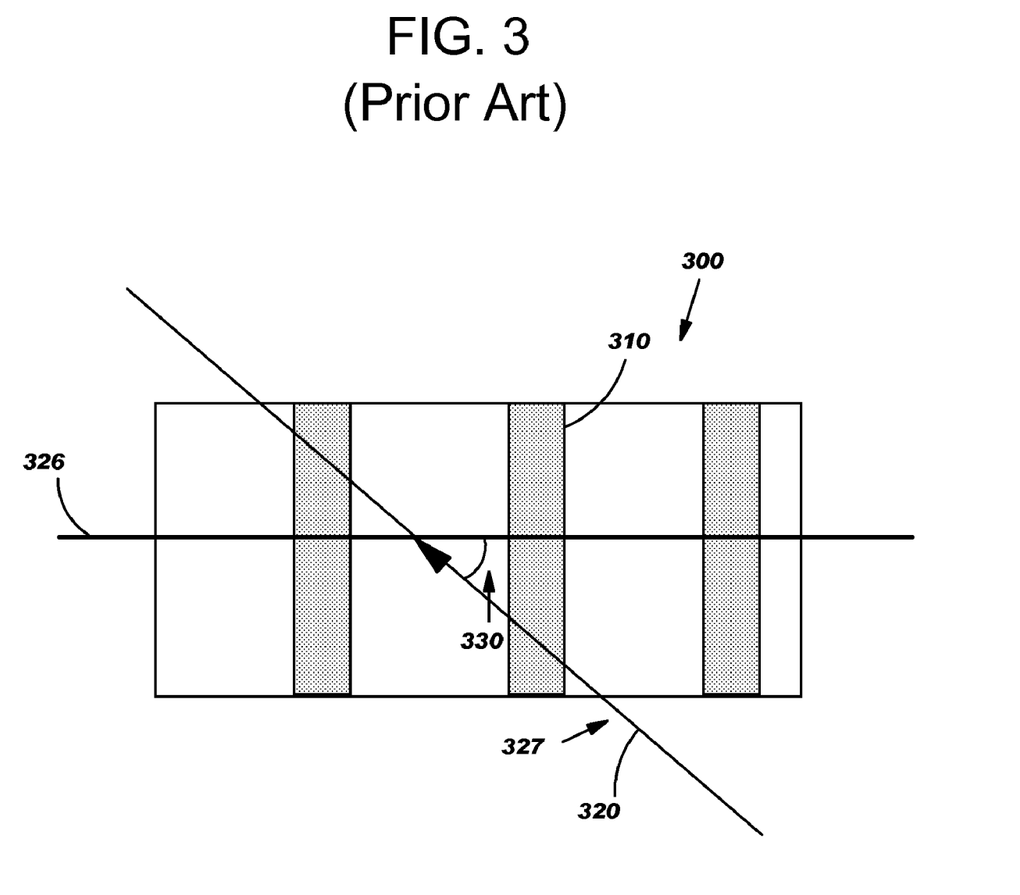
FIG. 3 shows an illustrative Azimuth angle of an incident beam to a wafer according to prior art.

The angle between the plane containing incident beam 320 and ideal plane of incidence 326 is referred to as an Azimuth angle of incidence beam 320 to target 300, specifically, to grating lines 310 of target 300. FIG. 3 shows an illustrative Azimuth angle ($\alpha$) 330 of incident beam 320 to grating lines 310 of target 300. As such, Azimuth angle 330 represents a deviation between actual plane of incidence 327 and ideal plane of incidence 326.

Conventional approaches to Scatterometry either do not pay attention to the Azimuth angles of different Scatterometry tools or simply assume that the Azimuth angles are the same for all the tools. No effort has been made to determine an Azimuth angle of an incident beam to a wafer.

SUMMARY

A first aspect of the disclosure is directed to a method for determining an Azimuth angle of an incident beam to a wafer, the method comprising: using the incident beam to make a first set of measurements of calibration targets of a first set of grating angles that are different than one another; analyzing the first set of measurements to determine a reference grating angle which corresponds to a grating line to which the incident beam has a practically zero Azimuth angle; and determining the Azimuth angle of the incident beam to the wafer using the determined reference grating angle.

A second aspect of the disclosure is directed to a system for determining an Azimuth angle of an incident beam to a wafer, the system comprising: measurement means for using the incident beam to make a first set of measurements of calibration targets of a first set of grating angles that are different than one another; means for analyzing the first set of measurements to determine a reference grating angle which corresponds to a grating line to which the incident beam has a practically zero Azimuth angle; and means for determining the Azimuth angle of the incident beam to the wafer using the determined reference grating angle.

A third aspect of the disclosure is directed to a computer program product for determining an Azimuth angle of an incident beam to a wafer, comprising computer usable program code which, when executed by a computer system, enables the computer system to: control using the incident beam to make a first set of measurements of calibration targets of a first set of grating angles that are different than one another; analyze the first set of measurements to determine a reference grating angle which corresponds to a grating line to which the incident beam has a practically zero Azimuth angle; and determine the Azimuth angle of the incident beam to the wafer using the determined reference grating angle.

A fourth aspect of the disclosure is directed to a method for deploying a system for determining an Azimuth angle of an incident beam to a wafer, comprising: providing a computer infrastructure being operable to: control using the incident beam to make a first set of measurements of calibration targets of a first set of grating angles that are different than one another; analyze the first set of measurements to determine an reference grating angle which corresponds to a grating line to which the incident beam has a practically zero Azimuth angle; and determine the Azimuth angle of the incident beam to the wafer using the determined reference grating angle.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE DRAWINGS

The embodiments of this disclosure will be described in detail, with reference to the following figures, wherein like designations denote like elements, and wherein.

It is noted that the drawings of the disclosure are not to scale. The drawings are intended to depict only typical aspects of the disclosure, and therefore should not be considered as limiting the scope of the disclosure. In the drawings, like numbering represents like elements among the drawings.

DETAILED DESCRIPTION OF THE DISCLOSURE

The following detailed description of embodiments refers to the accompanying drawings, which illustrate specific embodiments of the disclosure. Other embodiments having different structures and operations do not depart from the scope of the present disclosure.

1. SYSTEM OVERVIEW

The current methods are based on the understandings that wafer parameters measured by Scatterometry are a function of the Azimuth angle of the incident light beam to the wafer. The influence of the Azimuth angle depends on the characteristics of the wafer and the optical model. In order for Scatterometry tools to match one another and yield accurate and reliable results, it is required that the orientation of the incident beam in relation to the wafer or the grating orientation thereof, e.g., the Azimuth angle, be determined and controlled.

Figure 4:
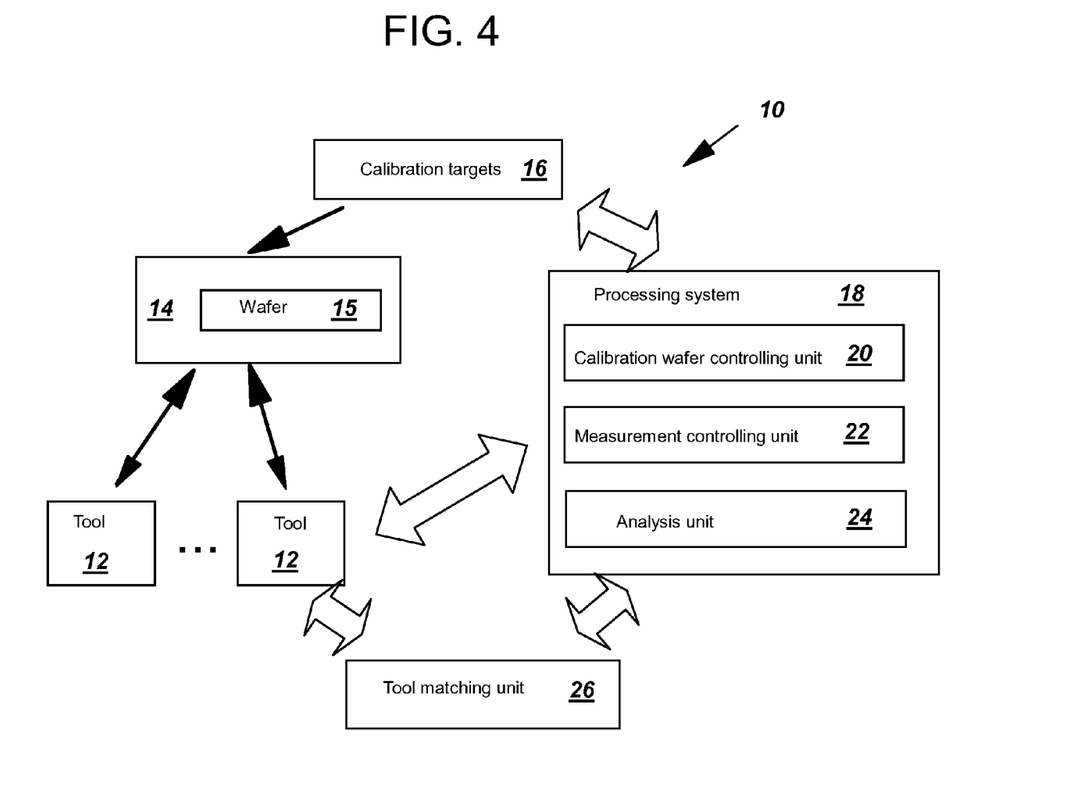
FIG. 4 shows a schematic diagram of a system according to an embodiment.

FIG. 4 shows a block diagram of a system 10 according to an embodiment. System 10 includes multiple Scatterometry tools (tool) 12 each using an incident beam to measure a wafer 15 in a position 14; a calibration wafer system 16 capable of being positioned in position 14; a processing system 18 including a calibration wafer controlling unit 20, a measurement controlling unit 22 and an analysis unit 24; and a tool matching unit 26. In operation, calibration wafer controlling unit 20 may control calibration wafer system 16 to be positioned in position 14 in a desired manner and measurement controlling unit 22 may control tool 12 to use the incident beam to make measurement of a parameter of calibration wafer system 16. The measurement results, as well as information regarding calibration wafer system 16, e.g., grating angles and positions thereof, and/or tool 12 will be obtained by processing system 18 and will be processed by analysis unit 24 to determine an Azimuth angle of the incident beam to wafer 15.

As is appreciated, an Azimuth angle of an incident beam to wafer 15 is defined with respect to a grating line of wafer 15 that the incident beam strikes. Preferably, an Azimuth angle of zero can achieve a better performance in the measurement such that all tools 12 are usually tuned to have an incident beam striking wafer 14 with zero Azimuth angles. However, due to various reasons, the incident beams of tools 12 may have a non-zero Azimuth angle to wafer 15, the actual values of which need to be determined and compensated. Calibration wafer controlling unit 20 may control calibration wafer system 16 to have configurations of various grating line orientations compared to that of wafer 15. In this description, an angle between a grating line and a certain reference line is referred to as a "grating angle". Here, for simplicity purposes, the grating lines of wafer 15 are used as the reference line and a grating angle of calibration wafer system 16 configuration is an angle between the grating lines thereof to the grating lines of wafer 15. Using other reference lines to define grating angles are also possible and do not change the application of the methods.

Calibration wafer system 16 may include various configurations of grating angles. Any method may be used to achieve this and all are included. According to an embodiment, calibration wafer system 16 includes multiple calibration wafers which are substantially identical to one another in all parameters except that they have printed grating lines of different grating angles. In this case, calibration wafer controlling unit 20 may control each of the calibration wafers in calibration wafer system 16 to be positioned in the same manner in position 14 to be measured by tool 12 using the incident beam to obtain multiple measurements. As such, each of the measurements is obtained with a different Azimuth angle between the incident beam of tool 12 and the calibration wafer because each calibration wafer includes a different grating angle.

According to another embodiment, calibration wafer controlling unit 20 may control a single calibration wafer of calibration wafer system 16 to be position in position 14 in different angles with respect to the grating line orientation of wafer 15. In this embodiment, the calibration wafer may be designed such that positioning calibration wafer 16 in different angles will not affect other parameters of the calibration wafer except the grating angle. For example, the calibration wafer may include a circle shape to eliminate the influence of edges in the different positioning.

According to another embodiment, calibration wafer system 16 may include calibration wafers that are different in parameters other than grating angles, which are related to sensitivity of a calibration wafer to the Azimuth angle of incident beam of tool 12 to the calibration wafer. For example, the other parameters may include the sensitivity of a calibration wafer to the incident beam. For example, calibration wafers of different pitch and line space ratios may be used in calibration wafer system 16. For calibration wafers of different other parameters, the determined Azimuth angles of tool 12 may be slightly different. The slightly different Azimuth angles may be used to calibrate tool 12 in measuring wafer 15 of different parameters. For systems with more than one light source (tool) 12, this may become necessary because two or more Azimuth angles need to be dealt with. For example, the determination of an Azimuth angle of an UV lamp (tool 12) and an Azimuth angle of a VIS lamp (tool 12) may require calibration wafers of different other parameters.

In the description herein, a calibration wafer system 16 configuration, i.e., a calibration wafer with specific parameters and positioned in position 14 in a specific manner, will be referred to as a calibration target 16. As such, each calibration target 16 may have a different grating angle and/or different other parameters. Calibration targets 16 can be different calibration wafers or the same calibration wafer in different angles of positioning as described above. Tool 12 will make a set of measurements of optical spectra (hereinafter 'measurements') of a set of calibration targets 16 using the incident beam.

The set of measurements of calibration targets 16 with different grating angles and/or different other parameters will be analyzed by analysis unit 24 to determine an Azimuth angle of the incident beam of tool 12 to wafer 15 as will be described herein.

The determined Azimuth angles of the incident beams of tools 12 to wafer 15 will be output to tool matching unit 26 to match tools 12 with respect to the measuring of wafer 15. For example, the determined Azimuth angles can be corrected by either changing the Scatterometry recipes/libraries or by resetting the hardware alignments or by applying tool specific wafer load angle corrections.

2. COMPUTER ENVIRONMENT

Figure 5:
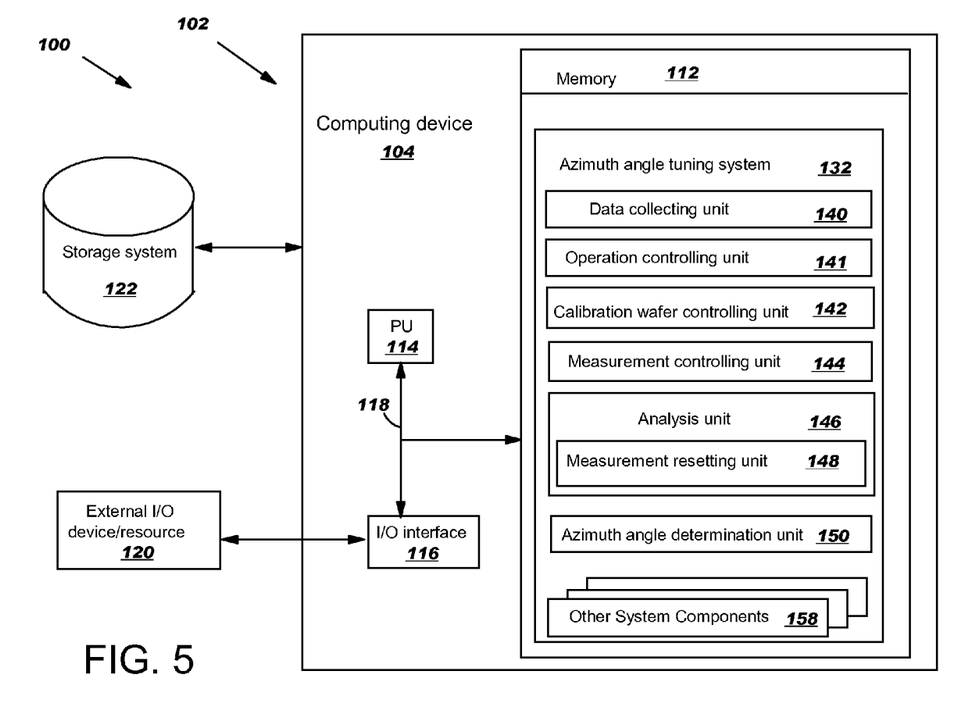
FIG. 5 shows an illustrative computing environment for determining an Azimuth angle of an incident beam to a wafer according to an embodiment.

FIG. 5 shows an illustrative environment 100 for determining an Azimuth angle of an incident beam to wafer 15. To this extent, environment 100 includes a computer infrastructure 102 that can perform the various processes described herein for determining the Azimuth angle of the incident beam. In particular, computer infrastructure 102 is shown including a computing device 104 that comprises an Azimuth angle tuning system 132, which enables computing device 104 to perform the process(es) described herein.

Computing device 104 is shown including a memory 112, a processing unit (PU) 114, an input/output (I/O) interface 116, and a bus 118. Further, computing device 104 is shown in communication with an external I/O device/resource 120 and a storage system 122. In general, PU 114 executes computer program code, such as Azimuth angle tuning system 132, that is stored in memory 112 and/or storage system 122. While executing computer program code, PU 114 can read and/or write data to/from memory 112, storage system 122, and/or I/O interface 116. Bus 118 provides a communications link between each of the components in computing device 104. I/O interface 116 can comprise any device that enables a user to interact with computing device 104 or any device that enables computing device 104 to communicate with one or more other computing devices. External I/O device/resource 120 can be coupled to the system either directly or through I/O interface 116.

In any event, computing device 104 can comprise any general purpose computing article of manufacture capable of executing computer program code installed thereon. However, it is understood that computing device 104 and Azimuth angle tuning system 132 are only representative of various possible equivalent computing devices that may perform the various processes of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in an embodiment, computer infrastructure 102 comprises two or more computing devices that communicate over any type of wired and/or wireless communications link, such as a network, a shared memory, or the like, to perform the various processes of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

Azimuth angle tuning system 132 includes a data collecting unit 140; an operation controlling unit 141; a calibration wafer controlling unit 142; a measurement controlling unit 144; an analysis unit 146 including a measurement resetting unit 148; an Azimuth angle determination unit 150; and other system components 158. Other system components 158 may include any now known or later developed parts of a computer system required for Azimuth angle tuning system 132 but not individually delineated herein and understood by those skilled in the art. As should be appreciated, components of computer infrastructure 102 and Azimuth angle tuning system 132 may be located at different physical locations or at the same physical location.

According to an embodiment, computer infrastructure 102 and Azimuth angle tuning system 132 may be used to implement, inter alia, processing system 18 (FIG. 4). For example, calibration wafer controlling unit 142, measurement controlling unit 144 and analysis unit 146 may be used to achieve/implement calibration wafer controlling unit 20, measurement controlling unit 22 and analysis unit 24 (FIG. 4), respectively.

Inputs to computer infrastructure 102, e.g., through external I/O device/resource 120 and/or I/O interface 116, may include measurement results and/or information regarding calibration wafer system 16, and/or tool 12 (FIG. 4). Those data may be collected by data collecting unit 140 and may be analyzed by analysis unit 146. Outputs of computer infrastructure 102 may include the determined Azimuth angle of the incident beam of tool 12 to wafer 15, which may be used by tool matching unit 26 (FIG. 4) to calibrate or match tools 12. The operation of system 10 and Azimuth angle tuning system 132 are described together herein in detail.

3. OPERATION METHODOLOGY

Figure 6:
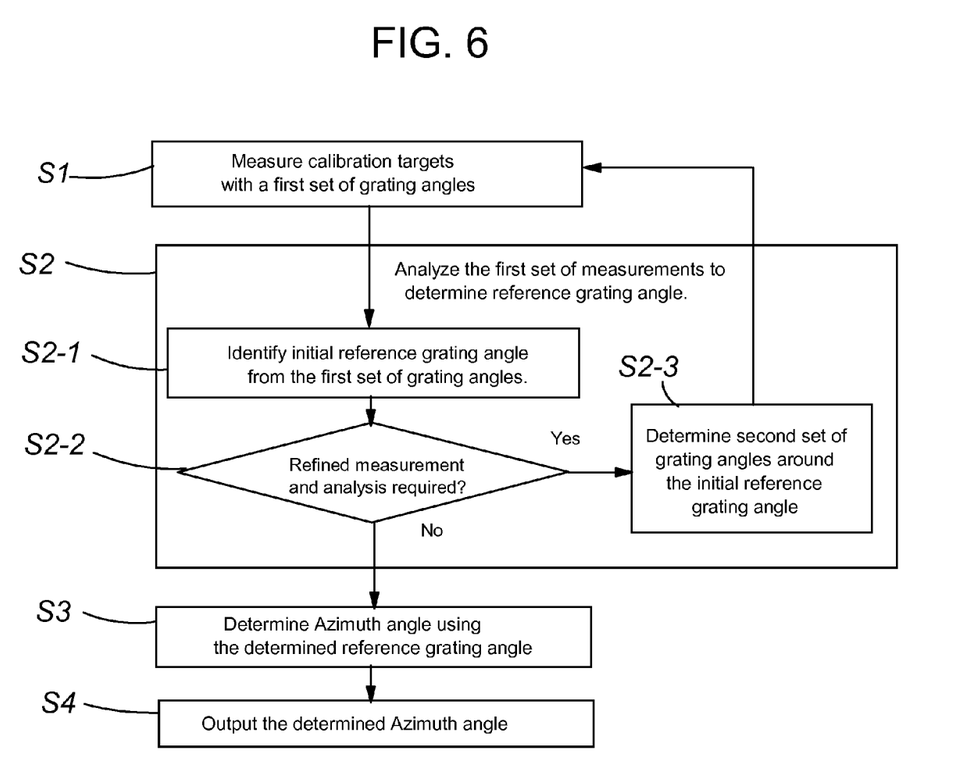
FIG. 6 shows an embodiment of an operation of an Azimuth angle tuning system.

An embodiment of the operation of Azimuth angle tuning system 132 is shown in the flow diagram of FIG. 6. Referring to FIGS. 4-6, in process S1, calibration wafer controlling unit 142 and measurement controlling unit 144 control tool 12 to measure calibration targets 16 with a first set of grating angles and/or other relevant parameters to obtain a set of measurements. Any characteristics of calibration targets 16 may be measured and all are included. Preferably, the characteristics of calibration targets 16 to be measured are known so that the measurement results can be evaluated based on the known values. Specifically, with respect to grating angles, measurement controlling unit 144 may determine a range of grating angles of calibration targets 16. Preferably, the range is set to enclose a zero grating angle (or enclose the grating angle of wafer 15 if it is not zero). The range of the grating angles may be determined in consideration of the possible variation of the Azimuth angle of the incident beam of tool 12 to wafer 15. For example, if the possible Azimuth angle of the incident beam of tool 12 to wafer 15 will vary from −4 to 4 degrees, the range of grating angles of calibration targets 16 may enclose the range from −4 to 4 degrees, e.g., −5 to 5 degrees. Measurement controlling unit 144 also determines a distribution of grating angles in the range. For example, the range may be divided into step points and the grating angles in the range may be evenly distributed among the step points, e.g., one in each step point. For illustrative purposes, it is assumed that measurement controlling unit 144 determines a range of −5 to 5 degrees and determines a step size of 1 degree in the range. Further, it is determined that one calibration target is allocated to each step point. As such, calibration targets 16 include grating angles of −5, −4, −3, −2, −1, 0, 1, 2, 3, 4, and 5 degrees. Tool 12 measures calibration targets 16 with the grating angles to obtain a first set of measurements.

In process S2, analysis unit analyzes the first set of measurements to determine a reference grating angle. The reference grating angle corresponds to a grating line to which the incident beam of tool 12 has a practically zero Azimuth angle. A practically zero Azimuth angle refers to a determined smallest Azimuth angle with the available measurement data, e.g., the first set of measurements.

As a measurement with zero Azimuth angle has the best performance compared to measurements with other Azimuth angles, the measurement with the practically zero Azimuth angle, i.e., the reference grating angle of calibration target 16, will match/fit the known characteristics of calibration targets 16 the best among other measurements. According to an embodiment, a figure of merits, e.g., goodness of fit, may be generated for the first set of measurements which indicates how good the measured characteristics of calibration targets 16 agree with the known actual characteristics of calibration targets 16. In such a goodness of fit figure, the measurement with the practically zero Azimuth angle will represent a turn point (referred to herein as the best matching measurement), either in the peak or in the valley of the goodness of fit curve.

Process S2 may include multiple sub-processes. In process S2-1, analysis unit 146 identifies an initial reference grating angle from the first set of grating angles. The initial reference grating angle corresponds to a smallest Azimuth angle of the incident beam to calibration targets 16 measured in process S1. Specifically, analysis unit 146 may determine a best matching measurement based on the first set of measurements and identify the respective grating angle of calibration target 16 as the initial reference grating angle. Any method may be used to determine the best matching measurement based on the first set of measurements and all are included. For example, according to an embodiment, analysis unit 146 identifies a best matching measurement value from the actual values of the first set of measurements and identifies the respective grating angle as the initial reference grating angle. This method needs to be performed by keeping other parameters constant. That is, if calibration targets 16 include variations in parameters other than grating angles, the first set of measurements need to be grouped based on the other parameters before the identification of the peak/valley value of the actual measurements.

According to another embodiment, a regression analysis may be used to identify the initial reference grating angle. For example, the first set of measurements may be fitted to generate a regression equation representing the relationship between the grating angles and the matching of the measurement values to the known actual values of calibration targets 16. The regression equation may then be used to determine the initial reference grating angle.

In sub-process S2-2, operation controlling unit 141 determines whether a refined measurement and analysis is required. The determination may be based on any standard. For example, operation controlling unit 141 may review the results of process S2-1 to determine whether a required accuracy/refinement is met. Also, operation controlling unit 141 may check whether sub-process S2-1 generates valid results. For example, if in S2-1, two substantially similar best matching measurements are identified which correspond to two substantially different grating angles, the results may not be valid and a refined measurement is required. If operation controlling unit 141 determines that a refined measurement and analysis is required ('yes'), the operation goes to sub-process S2-3; Otherwise, if operation controlling unit 141 determines that a refined measurement and analysis is not required ('no'), the initial reference grating angle is treated as a final one, and the operation goes to process S3 directly.

In sub-process S2-3, measurement resetting unit 148 determines a second set of grating angles around the initial reference grating angle to, e.g., further refine the measurements. The second set of grating angles may have a range narrower than the first set of grating angles and may include finer differences, e.g., finer step-size, between one another than the first step of grating angles. For example, assuming that the grating angle of −1 degree is determined as the initial reference grating angle in sub-process S2-1, measurement resetting unit 148 may determine a second set of grating angles between −2 and 2 degrees and with a step size of 0.5 degrees, i.e., the second set of grating angles include −2, −1.5, −1, −0.5, 0, 0.5, 1, 1.5, and 2 degrees. Calibration targets 16 with the reset second set of grating angles will be measured in process S1 and analyzed in process S2.

Figure 7:
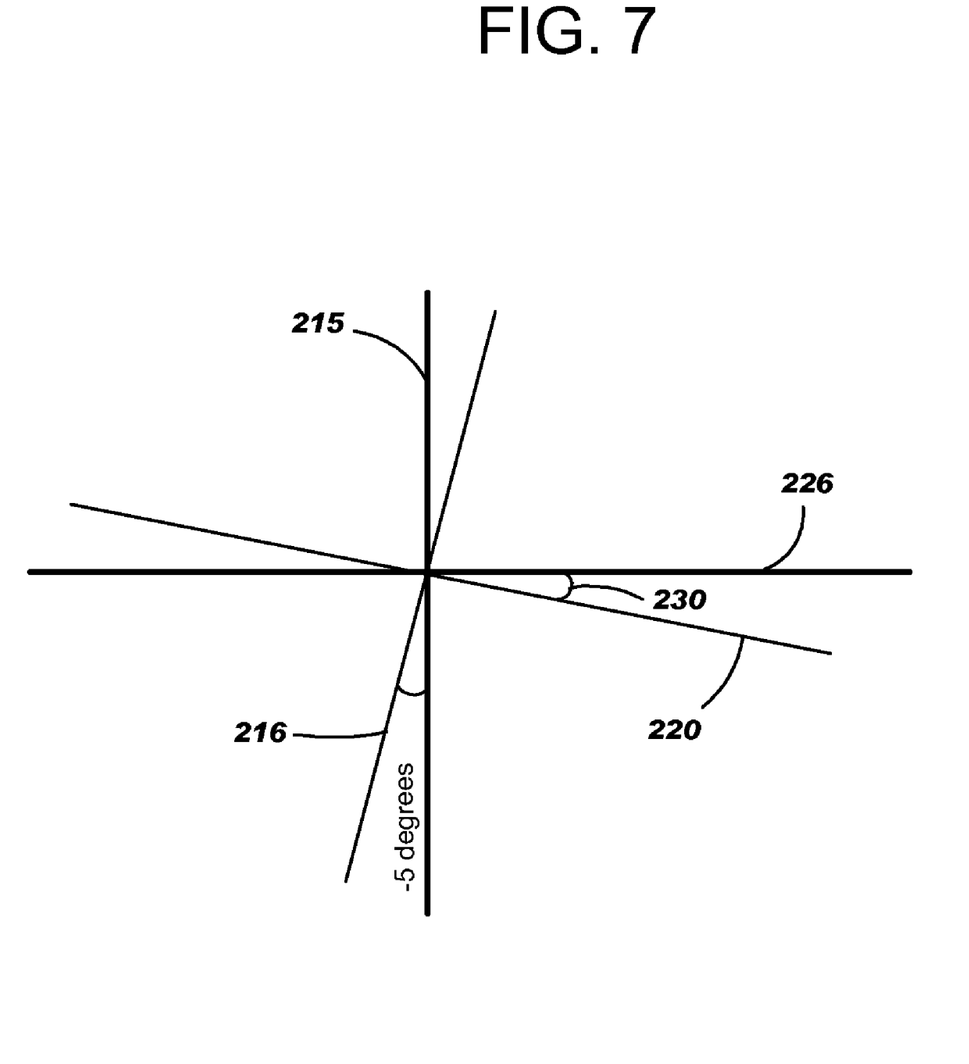
FIG. 7 shows the determination of an Azimuth angle to wafer based on a reference grating angle.

In process S3, Azimuth angle determination unit 150 determines the Azimuth angle of the incident beam of tool 12 (FIG. 4) to wafer 15 using the determined reference grating angle. FIG. 7 shows the determination of the Azimuth angle to wafer 15 (FIG. 4). As shown in FIG. 7, it is assumed that grating line 215 of wafer 15 (FIG. 4) has zero grating angles and grating line 216 of a calibration target 16 (FIG. 4) has −5 degrees (a clockwise angle being identified as a negative angle). It is further assumed that the reference grating angle is determined as −5 degrees. By the definition of a reference grating angle, incident beam 220 of tool 12 (FIG. 4) is determined as having a practically zero Azimuth angle, i.e., practically normal to grating line 216 that has the reference grating angle of −5 degree. For grating line 215 of wafer 15 (FIG. 4), the ideal incident plane (line) is 226. As such, the Azimuth angle (α) 230 of incident beam 220 to grating line 215 of wafer 15 (FIG. 4) is −5 degrees, which is equal to the reference grating angle. In process S3, Azimuth angle determination unit 150 may determine multiple Azimuth angles of the incident beam of a tool 12 to wafer 15 (FIG. 4) of different characteristics based on the other parameters of calibration targets 16.

In process S4, Azimuth angle tuning system 132 outputs the determined Azimuth angle of the incident beam of a tool 12 to, e.g., tool matching unit 26 for matching tools 12 based on the respective Azimuth angles. For example, tool matching unit 26 may adjust the measurements of wafer 15 (FIG. 4) obtained from each tool 12 based on the respective Azimuth angle of the incident beam of the tool 12 to wafer 15 to make the measurements of multiple tools 12 matching. Tool matching unit 26 may also physically adjust the Azimuth angle of each tool 12 to be substantially zero or substantially the same. Other uses of the determined Azimuth angles of incident beams of tools 12 are also possible and included in the disclosure.

4. CONCLUSION

While shown and described herein as a method and system for determining an Azimuth angle of an incident beam to a wafer, it is understood that the disclosure further provides various alternative embodiments. For example, in an embodiment, the disclosure provides a program product stored on a computer-readable medium, which when executed, enables a computer infrastructure to determine an Azimuth angle of an incident beam to a wafer. To this extent, the computer-readable medium includes program code, such as Azimuth angle tuning system 132 (FIG. 5), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 112 (FIG. 5) and/or storage system 122 (FIG. 5), and/or as a data signal traveling over a network (e.g., during a wired/wireless electronic distribution of the program product).

It should be appreciated that the teachings of the present disclosure could be offered as a business method on a subscription or fee basis. For example, a system 10 (FIG. 4), a computing device 104 comprising Azimuth angle tuning system 132 (FIG. 5) could be created, maintained and/or deployed by a service provider that offers the functions described herein for customers. That is, a service provider could offer to provide a service to encourage a virtual world user to perform a conduct as described above.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the disclosure has other applications in other environments. This application is intended to cover any adaptations or variations of the present disclosure. The following claims are in no way intended to limit the scope of the disclosure to the specific embodiments described herein.

What is claimed is:

1. A method for determining an Azimuth angle of an incident beam to a wafer, the method comprising:
   using the incident beam to make a first set of measurements of calibration targets of a first set of grating angles that are different than one another;
   analyzing the first set of measurements to determine a reference grating angle which corresponds to a grating line to which the incident beam has a practically zero Azimuth angle;
   determining the Azimuth angle of the incident beam to the wafer using the determined reference grating angle; and
   matching tools that use incident beams to measure the wafer based on determined Azimuth angles of the incident beams to the wafer;
   wherein the calibration targets of the first set of measurements include a sensitivity of a calibration target to the incident beam, the sensitivity being considered in the analyzing.

2. The method of claim 1, wherein the calibration targets are substantially identical to one another in a parameter other than grating angles.

3. The method of claim 1, wherein the calibration targets are implemented by positioning a same calibration wafer in different angles with respect to a grating line of the wafer.

4. The method of claim 1, wherein the analyzing includes:
   identifying an initial reference grating angle from the first set of grating angles, the initial reference grating angle corresponding to a smallest Azimuth angle of the incident beam to the calibration targets used in the first set of measurements;
   determining a second set of grating angles around the initial reference grating angle, the second set of grating angles having a range narrower than that of the first set of grating angles and including a finer difference between one another than the first set of grating angles; and
   using the incident beam to make a second set of measurements of calibration targets of the second set of grating angles; and
   analyzing the second set of measurements to determine the reference grating angle.

5. The method of claim 1, wherein the analyzing includes fitting the first set of measurements using a regression analysis to determine the reference grating angle.

6. A system for determining an Azimuth angle of an incident beam to a wafer, the system comprising:
   measurement means for using the incident beam to make a first set of measurements of calibration targets of a first set of grating angles that are different than one another;
   means for analyzing the first set of measurements to determine a reference grating angle which corresponds to a grating line to which the incident beam has a practically zero Azimuth angle;
   means for determining the Azimuth angle of the incident beam to the wafer using the determined reference grating angle; and
   means for matching tools that use incident beams to measure the wafer based on determined Azimuth angles of the incident beams to the wafer;
   wherein the calibration targets are at least one of:
      substantially identical to one another in a parameter other than grating angles; or
      implemented by positioning a same calibration wafer in different angles with respect to a grating line of the wafer; and
   wherein the calibration targets of the first set of measurements include a parameter other than grating angles, and the analyzing means considers the other parameter in the analyzing.

7. The system of claim 6, wherein the analyzing means:
   identifies an initial reference grating angle from the first set of grating angles, the initial reference grating angle corresponding to a smallest Azimuth angle of the incident beam to the calibration targets used in the first set of measurements;
   determines a second set of grating angles around the initial reference grating angle, the second set of grating angles having a range narrower than that of the first set of grating angles and including a finer difference between one another than the first set of grating angles;
   communicates the second set of grating angles to the measurement means to use the incident beam to make a second set of measurements of calibration targets of the second set of grating angles; and
   analyzes the second set of measurements to determine the reference grating angle.

8. The system of claim 6, wherein the analyzing means fits the first set of measurements using a regression analysis to determine the reference grating angle.

9. A computer program product for determining an Azimuth angle of an incident beam to a wafer, comprising computer usable program code which, when executed by a computer system, enables the computer system to:

control using the incident beam to make a first set of measurements of calibration targets of a first set of grating angles that are different than one another;

analyze the first set of measurements to determine a reference grating angle which corresponds to a grating line to which the incident beam has a practically zero Azimuth angle;

determine the Azimuth angle of the incident beam to the wafer using the determined reference grating angle; and output determined Azimuth angles of incident beams of tools to the wafer for matching the tools in measuring the wafer;

wherein the calibration targets are at least one of:

substantially identical to one another in a parameter other than grating angles; or implemented by positioning a same calibration wafer in different angles with respect to a grating line of the wafer; and wherein in the case the calibration targets of the first set of measurements include a parameter other than grating angles, the program code is further configured to enable the computer system to consider the other parameter in the analyzing.

10. The program product of claim 9, wherein the program code is further configured to enable the computer system to:

identify an initial reference grating angle from the first set of grating angles, the initial reference grating angle corresponding to a smallest Azimuth angle of the incident beam to the calibration targets used in the first set of measurements;

determine a second set of grating angles around the initial reference grating angle, the second set of grating angles having a range narrower than that of the first set of grating angles and including a finer difference between one another than the first set of grating angles;

control using the incident beam to make a second set of measurements of calibration targets of the second set of grating angles; and analyze the second set of measurements to determine the reference grating angle.

11. The program product of claim 9, wherein the program code is further configured to enable the computer system to fit the first set of measurements using a regression analysis to determine the reference grating angle.

12. A method for deploying a system for determining an Azimuth angle of an incident beam to a wafer, comprising:

providing a computer infrastructure being operable to:

control using the incident beam to make a first set of measurements of calibration targets of a first set of grating angles that are different than one another;

analyze the first set of measurements to determine an reference grating angle which corresponds to a grating line to which the incident beam has a practically zero Azimuth angle;

determine the Azimuth angle of the incident beam to the wafer using the determined reference grating angle; and output determined Azimuth angles of incident beams of tools to the wafer for matching the tools in measuring the wafer.

* * * * *